No. 851,741. PATENTED APR. 30, 1907.
J. S. GARDNER.
SEED PLANTER.
APPLICATION FILED AUG. 16, 1906.
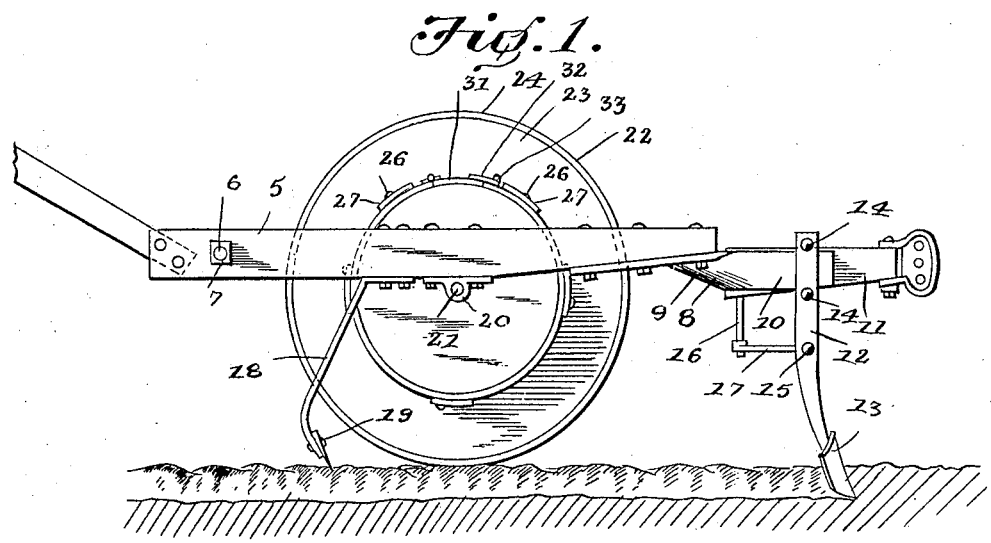
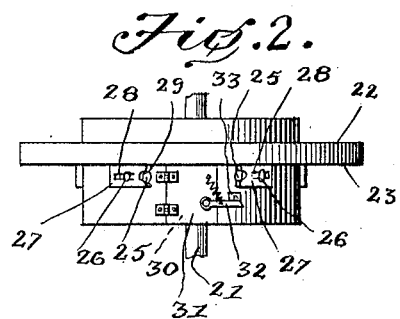
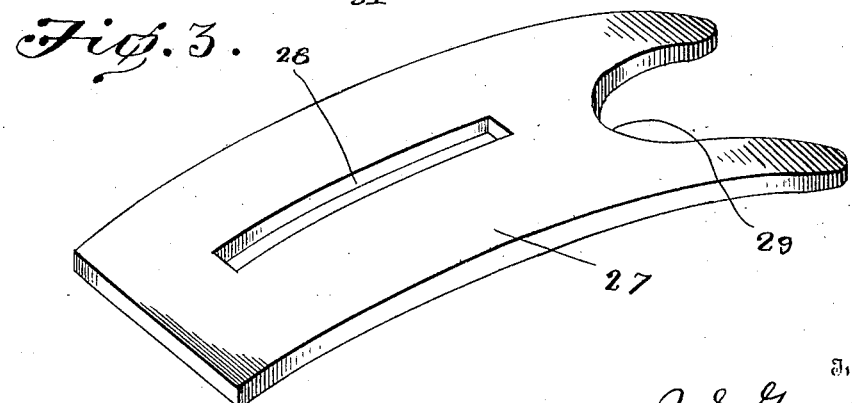
Witnesses
W. S. Rockwell
F. B. MacNab
Inventor
J. S. Gardner
By
Attorneys

UNITED STATES PATENT OFFICE.

JAMES S. GARDNER, OF JAVA, ALABAMA, ASSIGNOR OF ONE-HALF TO JESSE W. DISMUKES, OF JAVA, ALABAMA.

SEED-PLANTER.

No. 851,741.  Specification of Letters Patent.  Patented April 30, 1907.

Application filed August 16, 1906. Serial No. 330,907.

*To all whom it may concern:*

Be it known that I, JAMES S. GARDNER, a citizen of the United States, residing at Java, in the county of Coffee, State of Alabama, have invented certain new and useful Improvements in Seed-Planters; and I do hereby declare the following to be a full, clear, and exact description of the invention, such as will enable others skilled in the art to which it appertains to make and use the same.

This invention relates to seed planters, and more particularly to that class including a hollow planting wheel in which the seeds to be planted are contained and from which they are deposited in the furrow made by the furrow opener of the implement.

The primary object of the invention is to provide a novel construction of planting wheel for an implement of this nature, which will be efficient in operation and at the same time extremely simple in construction.

Broadly speaking the planting wheel comprises a hollow body provided upon its periphery with a continuous flange which is designed to run in the furrow made by the furrow opener of the implement and a novel construction of feed regulating member which is adjustably arranged upon the periphery of the wheel and is arranged to partially or entirely close openings in the said periphery of the wheel through which opening the seeds are discharged.

A further object of the invention is to provide upon the periphery of the wheel a hinged door, the opening in the wheel which the door is designed to close, being for the introduction of the seeds into the wheel.

In the accompanying drawings Figure 1 is a side elevation of the implement. Fig. 2 is a plan view of the planting wheel of the implement and Fig. 3 is a detailed perspective view of one of the feed regulating members.

Referring more specifically to the drawings the numeral 5 denotes the side sills of the frame of the implement and 6 a brace rod which connects the side sills 5 at their rear ends, the said brace rod being screw-threaded at each of its ends and having upon each of the screw-threaded portions, a pair of nuts 7 which abut opposite sides of the respective side sills 5.

Bolted or otherwise secured to the under side of each of the side sills 5 at their forward ends is a resilient arm 8 which is twisted and extended inwardly and laterally as at 9 and the forward end of the said arms 8 are thence bent to extend forwardly as at 10 in spaced parallel relation with respect to each other for the reception therebetween of the beam 11 of the implement, the said beam being held securely in this position by means of bolts. The furrow opener of the implement comprises a pair of spaced members 12 at the lower ends of which is secured a foot 13, the said members 12 being connected by means of bolts 14 which are engaged therethrough directly above and below the beam 11, there being also a bolt 15 connecting the said members below the lowermost ones of bolt 14 and connecting said bolt 15 and a pin 16 which is secured to the under side of the beam 11, and 17 is a brace rod. It will be observed from the foregoing that by forming the arms of resilient metal and twisting them in the manner stated, the furrow opener will give to a certain extent should it strike a stump or rock.

Secured at their upper ends to each of the side sills 5 of the frame and adjacent the middle thereof, is a resilient standard 18 and a scraper blade 19 secured at its ends to the lower end of said standards and connects the same.

Journaled in suitable bearing brackets 20 which are mounted from the under side of the beams 5 is an axle 21 upon which is mounted the planting wheel 22 embodying my invention. Said planting wheel is of hollow construction and provided upon its periphery with an integral continuous flange 23 which is located at one side of the center of the wheel 22 and is designed to run in the furrow made by the furrow opener above described but at one side of the furrow and the said flange is provided upon its periphery with a band or tire 24.

A plurality of seed discharge openings 25 is formed in the periphery of the wheel and at equi-distant points thereon, and adjustably secured by means of set screws upon the outer periphery of the wheel and adjacent each of said openings 25 therein is a feed regulating plate 27, the said set screws being engaged through slots 28 formed in the said plates, it being understood of course that the plates are curved to conform to the curvature of the wheel 22. That end of the plate which lies adjacent its corresponding opening, is bifurcated as at 29, the width of the bifurcation being substantially the same as the diameter of the opening, and will be readily understood that by adjusting the plates to and from their respective openings, the diameter of the openings will be increased or decreased as the case may be to regulate the discharge of the seeds from the wheel.

In order that seeds may be readily introduced into the wheel, an opening 30 is formed in the periphery of the wheel and a door 31 is hinged to the said periphery of the wheel in position to close the opening when the implement is in use, there being a spring latch 32 arranged upon the door for engagement with a keeper 33 upon the periphery of the wheel adjacent the opening, the said door being in this manner normally held closed.

The seed discharge openings are located in the major portion of the periphery of the wheel as determined by the flange 23, and hence will permit discharge of the seeds directly in the middle or deepest portion of the furrow.

What is claimed is:

A planting wheel for an implement of the class described comprising a hollow body portion, a flange formed continuously about the portion and to one side of the middle of the same, said body portion being provided with openings to one side of the flange, slotted plates disposed upon the body portion, and bolts carried by the body portion and extending through the slots in the plates for holding the plates in place upon the body portion, said plates having their inner edges abutting the flange upon the body portion whereby the plates may be guided while being adjusted.

In testimony whereof, I affix my signature, in presence of two witnesses.

JAMES S. GARDNER.

Witnesses:
  M. J. OWENS,
  CARL WALKER.